(12) United States Patent
Porcs

(10) Patent No.: US 7,706,150 B2
(45) Date of Patent: Apr. 27, 2010

(54) SWITCH MOUNT

(75) Inventor: Robert Anthony Porcs, Waterford, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 151 days.

(21) Appl. No.: 11/877,774

(22) Filed: Oct. 24, 2007

(65) Prior Publication Data

US 2009/0109647 A1    Apr. 30, 2009

(51) Int. Cl.
*H05K 7/00* (2006.01)
(52) U.S. Cl. .................................. 361/837; 361/807
(58) Field of Classification Search ............ 361/644, 361/647, 664, 679, 688, 690, 777, 837, 807, 361/810, 801–803; 174/522, 524, 525, 34 R, 174/35 MS; 180/90; 340/815.49, 815.78, 340/995; 439/34, 248, 736; 296/70, 72
See application file for complete search history.

(56) References Cited

U.S. PATENT DOCUMENTS

| | | | |
|---|---|---|---|
| 4,485,282 A | 11/1984 | Lee et al. | |
| 5,952,729 A | 9/1999 | Shiratori et al. | |
| 6,192,815 B1 | 2/2001 | Duttenhofer et al. | |
| 6,319,013 B2 * | 11/2001 | Nakao et al. | 439/34 |
| 6,344,621 B1 | 2/2002 | Shiratori et al. | |
| 6,680,842 B1 * | 1/2004 | Pelaez et al. | 361/631 |
| 6,853,289 B2 * | 2/2005 | Scoggin | 337/194 |
| 7,499,261 B2 * | 3/2009 | Hash | 361/625 |
| 2006/0255608 A1 * | 11/2006 | Dreyer et al. | 296/24.34 |

* cited by examiner

*Primary Examiner*—Jinhee J Lee
*Assistant Examiner*—Yuriy Semenenko
(74) *Attorney, Agent, or Firm*—Gifford, Krass, Sprinkle, Anderson & Citkowski, P.C.

(57) ABSTRACT

A panel for accepting a switch is disclosed, the panel having a generally rigid member with a front side and a back side. The generally rigid member also has a first edge and a second edge defining an aperture, through which the switch passes at least partially through. The back side of the rigid member has a first rib that extends therefrom, the first rib being proximate to the first edge and having a step that is operable to engage a barb of the switch that passes at least partially through the aperture. The back side also has a second rib that extends therefrom, the second rib being proximate to the second edge and also operable to engage a barb of the switch passing at least partially through the aperture.

6 Claims, 3 Drawing Sheets

US 7,706,150 B2

SWITCH MOUNT

FIELD OF THE INVENTION

The present invention relates to a switch mount, in particular to a switch mount in an instrument panel.

BACKGROUND OF THE INVENTION

A variety of electronic devices are used by individuals. Such electronic devices can require switches for lights, an air conditioner, a heater and the like. In particular, a motor vehicle contains a plurality of switches that control various devices and/or functions therein. For example, switches within the interior of the motor vehicle are used to turn on and/or off windshield wipers, an air conditioner, a heater, a rear windshield deicer, an interior lamp, a cruise control and the like. Thus, the interior of the vehicles requires a structure that affords for the mounting of switches.

An illustrative example of a prior art switch and the surrounding structure is shown in FIG. 4. In this figure, a panel P has an aperture into which a switch bezel BZ having a switch S attached thereto is inserted into the aperture of the panel P. Though being useful, the use of the switch bezel BZ incorporates an additional piece of equipment when the switch S is attached to the panel P. However, if switch bezel features are incorporated into the panel P, at least one of an inner rib r is die locked since the panel is typically molded with a die direction that is angled with respect to the inner rib r. Therefore, a switch mount that allows for a switch having barbs b to be attached to the panel P, and yet does not require a switch bezel BZ and/or does not result in a die lock portion, would be desirable.

SUMMARY OF THE INVENTION

A panel for accepting a switch is disclosed, the panel having a generally rigid member with a front side and a back side. The generally rigid member also has a first edge and a second edge defining an aperture, through which the switch passes at least partially through. The back side of the rigid member has a first rib that extends therefrom, the first rib being proximate to the first edge and having a step that is operable to engage a barb of the switch that passes at least partially through the aperture. The back side also has a second rib that extends therefrom, the second rib being proximate to the second edge and also operable to engage a barb of the switch passing at least partially through the aperture.

The second rib is spaced apart from the second edge and extends in a direction away from the back side of the generally rigid member. The second rib forms a generally U shape with the rigid member and can extend from the back side of the member at an angle between 15 and 60 degrees.

DETAILED DESCRIPTION OF THE INVENTION

The present invention discloses a switch mount for accepting a switch. As such, the switch mount has utility as an attachment device for a switch.

The switch mount can include a generally rigid member that has a front side and a back side. In some instances, the generally rigid member is in the form of a panel. The generally rigid member also has a first edge and a second edge defining an aperture that affords for the switch to pass at least partially therethrough. The back side of the generally rigid member has a first rib proximate to the first edge that extends in a generally normal direction therefrom. The first rib has a step that affords for a switch to be inserted a specific distance into the aperture. In addition, the first rib can engage a barb of the switch and thereby prevent the switch's removal. The back side also has a second rib, the second rib being proximate to but spaced apart from the second edge of the rigid member. The second rib extends in a direction away from the back side at an angle between 15 and 60 degrees, and affords engagement with a barb on the switch. The structure of the generally rigid member having the first rib and the second rib allows for the switch to be mounted at least partially within the panel and yet not require a switch bezel. In addition, the structure of the aperture and the second rib of the panel allows for manufacture of the rigid member without a die locked region.

Figure 1:
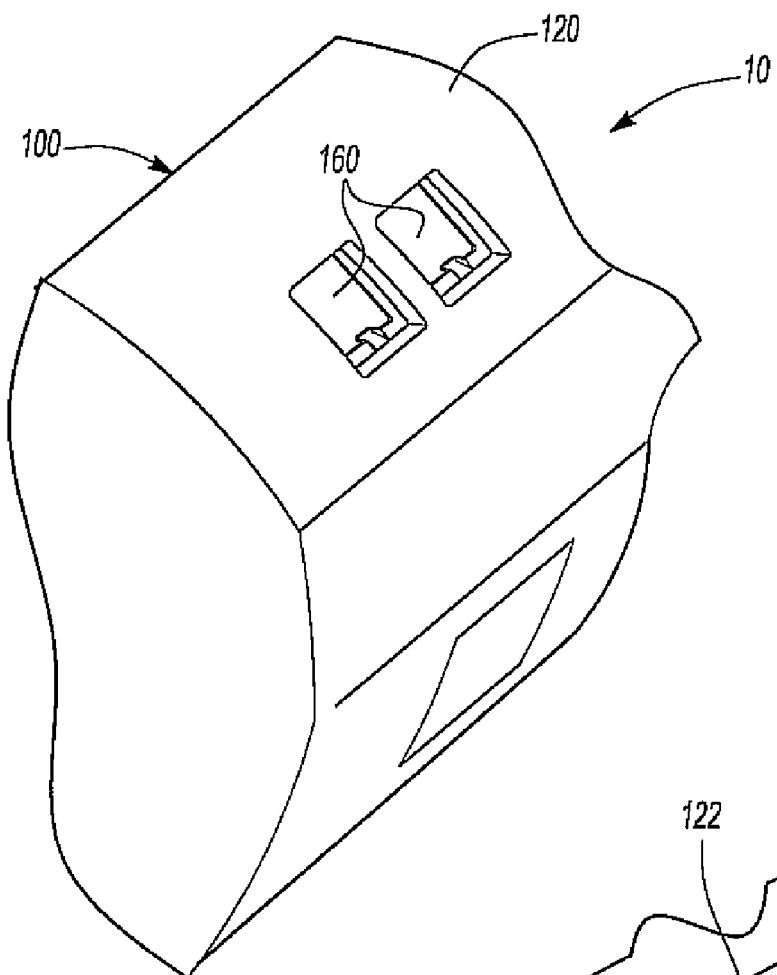
FIG. 1 is a perspective view of an embodiment of the present invention.
Figure 2:
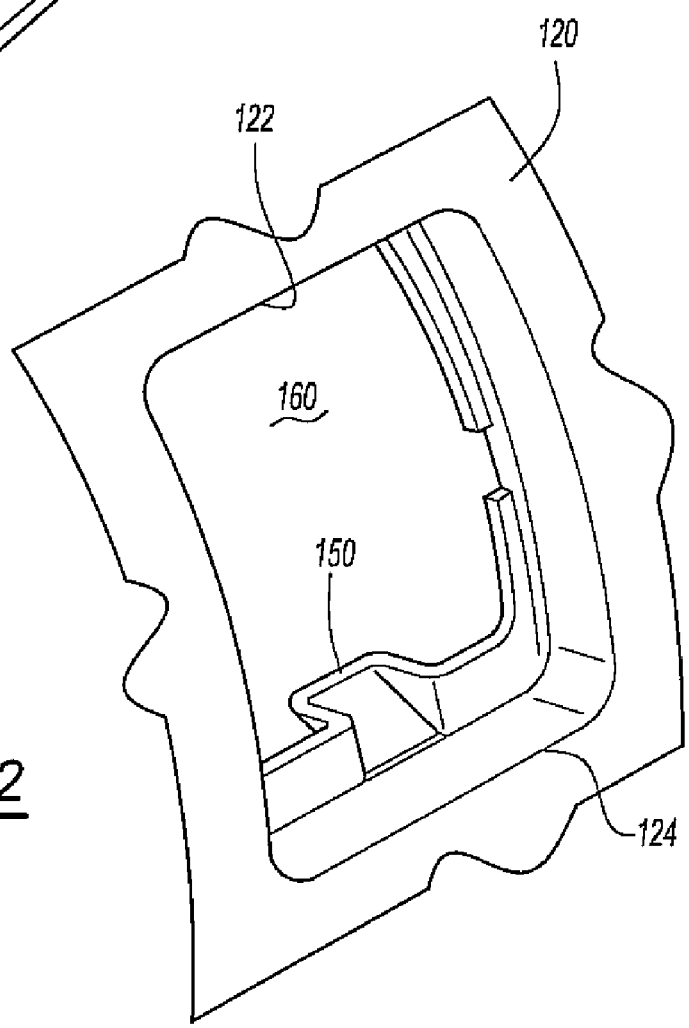
FIG. 2 is an enlarged view of an embodiment of the present invention.
Figure 3:
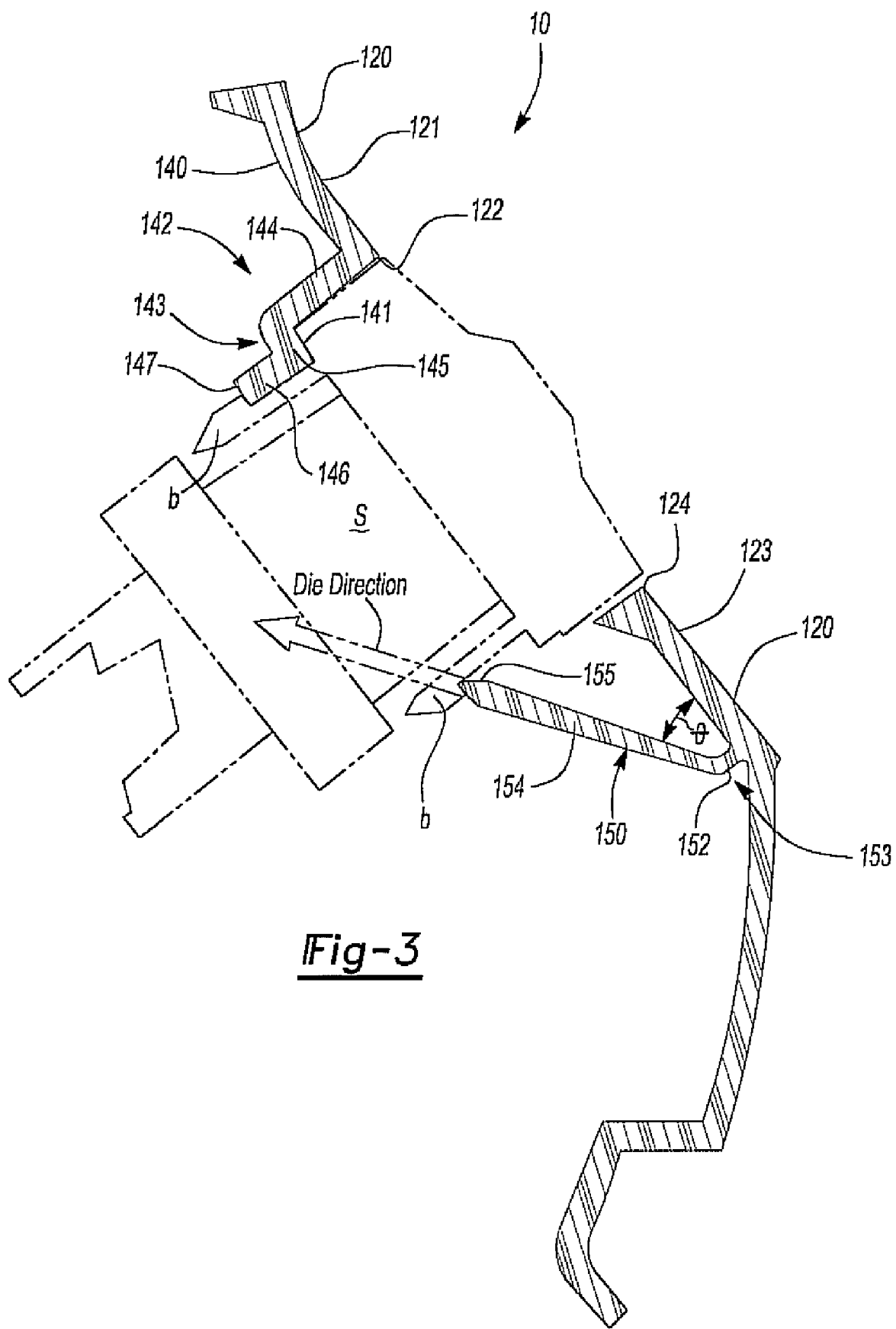
FIG. 3 is a side cross-sectional view of an embodiment of the present invention.
Figure 4:
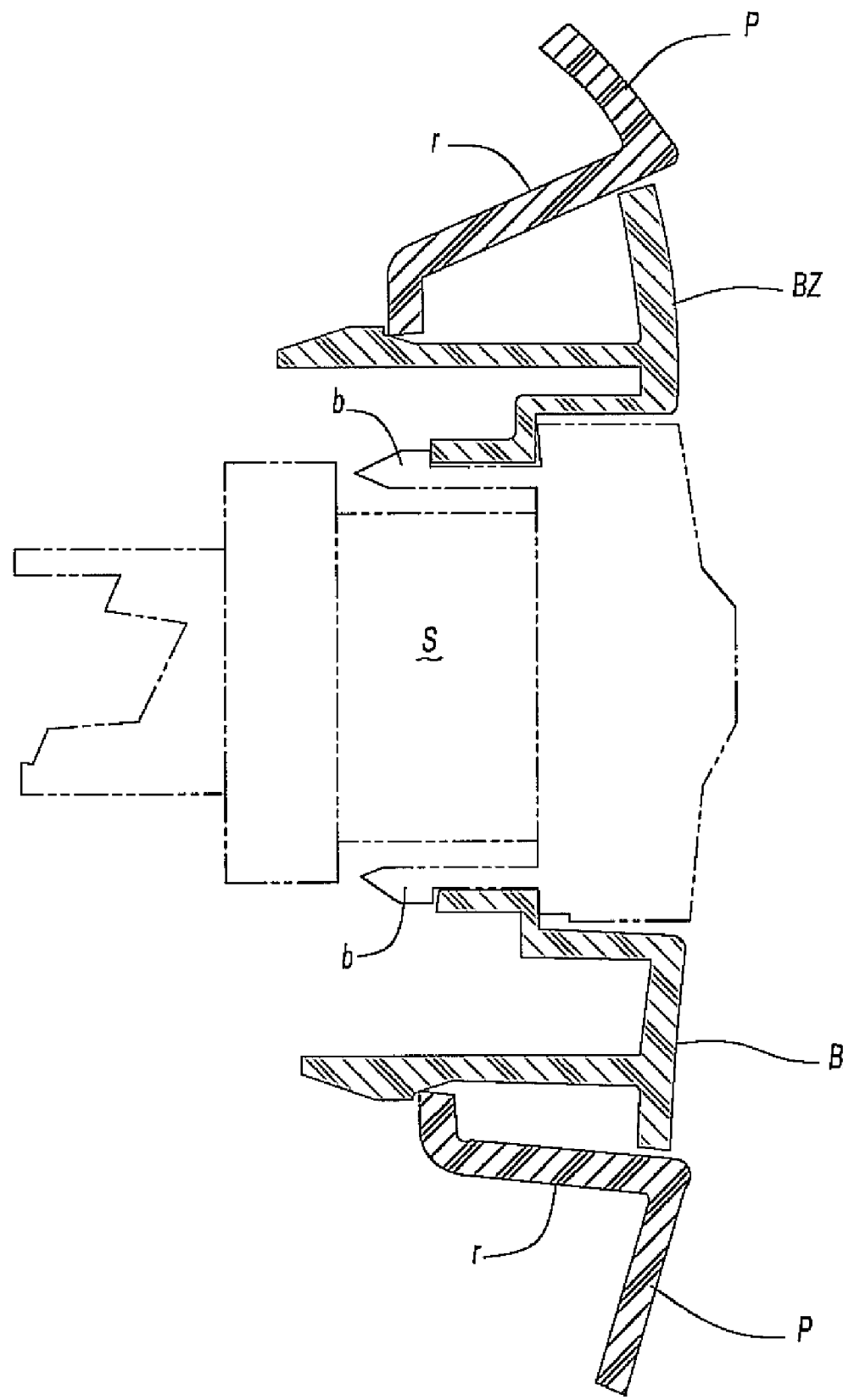
FIG. 4 is a side cross-sectional view of a prior art embodiment.

Turning now to FIGS. 1-3, an embodiment of the structure is shown generally at reference numeral 10. The structure includes a generally rigid member 100, the member 100 having a front side 120 and a back side 140. The member 100 also has at least one aperture 160 that is at least partially defined by a first edge 122 and a second edge 124. As shown in FIG. 1, the member 100 can have more than one aperture 160.

Extending from the back side 140 of the member 100 is a first rib 142. The first rib 142 can include a step 143, the step 143 having a step surface 141 that affords for the switch S to be inserted within the member 100 and at least partially through the aperture 160 a specific and predetermined distance. The step 143 can be defined by a first section 144, a second section 145 and a third section 146. The first section 144 extends from the back side 140 in a generally normal direction, the second section 145 extends from the first section 144 in a generally parallel direction to the back side 140, and the third section 146 extends from the second section 145 in a generally normal direction from the back side 140. The barb b of the switch S can travel past a barb end 147 of the third section 146 when the switch S is inserted into aperture 160 of the generally rigid member 100. After the barb b passes the barb end 147, the barb end 147 can engage the barb b and prevent the switch S from being removed from the member 100.

The member 100 also has a second rib 150 that is proximate to the second edge 124. The second edge extends from the back side 140 of the member 100 in a direction away from said back side. In some instances, the second rib 150 extends away from a section 123 proximate to the second edge 124 at an angle θ between 15 to 60 degrees. In other instances, the second rib 150 extends away from the section 123 at an angle between 25 and 40 degrees, while in still other instances the second rib 150 extends away from the section 123 at an angle between 30 and 40 degrees.

The second rib 150 has a first end 153 attached to the generally rigid member 100. The first end 153 is spaced apart from the second edge 124. The second rib 150 also has a second end 155 that a barb b from the switch S can travel past. Once the barb b travels past the second end 155 of the second rib 150, the second end 155 engages the barb b and can prevent the switch S from being removed from the member 100. In some instances, the second end 155 has a tip with a thickness that decreases with increasing distance from the first end 153. It is appreciated that the second rib 150 can be a single section that extends from the back side 140 of the member 100. It is also appreciated that the second rib 150 can have a first section 152 that extends in a generally normal direction from the section 123 and a second section 154 extending from the first section 152.

The direction the second rib 150 extends away from the back side 140 of the member 100 can be generally parallel to the die direction used in the manufacture of the member 100 as illustratively shown in FIG. 3. If the second rib 150 extends from the back side 140 in this manner, a die locked portion is prevented during the manufacture of the member 100. In this manner, a switch mount is provided that affords for a switch S to be attached to a generally rigid member without the use of a switch bezel. In addition, a switch mount is provided that allows for the rigid member to be produced without a die locked portion proximate to the switch aperture.

The member 100, first rib 142 and second rib 150 can be made from any material known to those skilled in the art, illustratively including metals, alloys, plastics, ceramics and combinations thereof.

The invention is not restricted to the illustrative examples described above. The examples are not intended as limitations on the scope of the invention. Methods, apparatus, compositions and the like described herein are exemplary and not intended as limitations on the scope of the invention. Changes therein and other uses will occur to those skilled in the art. The scope of the invention is defined by the scope of the claims.

I claim:

1. A panel for accepting a switch, said panel comprising:
   a generally rigid member having a front side and a back side, said member also having a first edge and a second edge defining an aperture for accepting the switch, said first edge oppositely disposed across said aperture from said second edge;
   said back side having a first rib extending in a generally normal direction therefrom, said first rib proximate said first edge and having a step operable to engage the switch passing at least partially through said aperture;
   said back side also having a second rib extending therefrom at an angle between 15 and 60 degrees, said second rib proximate to and spaced apart from said second edge and operable to engage the switch passing at least partially through said aperture.

2. The panel of claim 1, wherein said step of said first rib is defined by a first section extending from said back side in a generally normal direction, a second section extending from said first section in a generally parallel direction to said back side and a third section extending from said second section in a generally normal direction to said back side.

3. The panel of claim 2, wherein said second section of said first rib extends from said first section in a direction towards said aperture.

4. The panel of claim 1, wherein said second rib extends from said back side at angle between 25 and 45 degrees.

5. The panel of claim 1, wherein said second rib extends from said back side at angle between 30 and 40 degrees.

6. The panel of claim 1, wherein said second rib has a first section and a second section, said first section extending from said back side in a generally normal direction and said second section extending from said first section in a direction away from said back side.

* * * * *